United States Patent [19]  [11] 4,035,340
Eskamani et al. [45] July 12, 1977

[54] ACROLEIN-INDENE COPOLYMERS

[75] Inventors: Abolghassem Eskamani, North Randall; Robert Sanitra, Stow, both of Ohio

[73] Assignee: Standard Oil Company, Cleveland, Ohio

[21] Appl. No.: 664,626

[22] Filed: Mar. 8, 1976

[51] Int. Cl.$^2$ .............. C08F 232/00; C08F 236/00
[52] U.S. Cl. ............................. 260/73 R; 526/193; 526/218; 526/229; 526/308
[58] Field of Search ............... 260/73 R, 67 UA

[56] References Cited

U.S. PATENT DOCUMENTS

| | | | |
|---|---|---|---|
| 3,154,599 | 10/1964 | Wismer | 260/73 R |
| 3,379,689 | 4/1968 | Tanaka et al. | 260/73 R |
| 3,404,133 | 10/1968 | Kern et al. | 260/73 R |
| 3,809,680 | 5/1974 | Wakefield | 260/73 R |

OTHER PUBLICATIONS

C.A. vol. 74, 1971, 43597v, "Modification of Indene-coumarone resin by acrolein", Macionis et al.

*Primary Examiner*—Joseph L. Schofer
*Assistant Examiner*—Herbert J. Lilling
*Attorney, Agent, or Firm*—John F. Jones; Sherman J. Kemmer

[57] ABSTRACT

Thermoplastic-thermosetting polymers having good thermal stability are produced by the copolymerization of acrolein and indene.

4 Claims, No Drawings

ACROLEIN-INDENE COPOLYMERS

The present invention relates to novel polymeric compositions which have low permeability to gases, and more particularly pertains to gas and vapor barrier materials which are composed of an olefinic aldehyde and indene, and to a process for preparing same.

The novel polymeric products of the present invention are prepared by polymerizing an olefinically unsaturated aldehyde, such as acrolein, and indene.

The olefinic aldehydes most useful in this invention are acrolein and methacrolein, and acrolein is preferred.

The polymeric compositions of this invention can be prepared by any of the known general techniques of polymerization including the bulk polymerization, solution polymerization and emulsion or suspension polymerization techniques by batch, continuous or intermittent addition of the monomers and other components. The preferred method is emulsion polymerization. The polymerization is preferably carried out in aqueous medium in the presence of an emulsifier and a free-radical generating polymerization initiator at a temperature of from about 0° to 100° C in the substantial absence of molecular oxygen.

The preferred polymeric compositions embodied herein are those resulting from the polymerization of (A) from 25 to 75% by weight of a member selected from the group consisting of acrolein and methacrolein and (B) from 75 to 25% by weight of indene. More preferred are copolymers resulting from the copolymerization of from 50 to 75% by weight of acrolein and from 25 to 50% by weight of indene.

More specifically, the present invention can be illustrated in the polymerization of a mixture of acrolein and indene to form a product having good impermeability to gases and vapors when exposed to said gases and vapors in the form of a film or thin sheet.

The novel polymeric products of the present invention are thermoplastic materials which can be thermoset at elevated temperatures. These polymeric materials can be thermoformed into a wide variety of useful articles in any of the conventional ways employed with known thermoplastic polymeric materials, such as by extrusion, milling, molding, drawing, blowing, etc.. The polymeric products of this invention have excellent solvent resistance and are useful in the packaging industry being particularly useful in the manufacture of bottles, film and other types of containers for liquids and solids.

In the following illustrative examples, the amounts of ingredients are expressed in parts by weight unless otherwise indicated.

EXAMPLE 1

A copolymer of acrolein and indene was prepared using the following ingredients:

| Ingredient | Parts |
| --- | --- |
| acrolein | 50 |
| indene | 50 |
| emulsifier (Gafac RE-610)* | 7.5 |
| potassium persulfate | 2 |
| (or azobisisobutyronitrile) distilled water | 500 |

*A mixture of R-O-(CH$_2$CH$_2$O-)$_n$PO$_3$M$_2$ and [R-O-(CH$_2$CH$_2$O-)$_n$]$_2$PO$_2$M wherein n is a number from 1 to 40, R is an alkyl or alkaryl group and preferably a nonyl phenyl group, and M is hydrogen, ammonia or an alkali metal, which composition is sold by GAF Corporation.

The ingredients were placed in a polymerization reactor, swept with nitrogen to remove substantially all molecular oxygen, and the polymerization was allowed to proceed in the sealed reactor with constant agitation at 58° C for about 16 hours. The polymer was isolated from the resulting latex by pouring the latex into a hot aqueous solution of alum (40% aluminum sulfate). The thus coagulated polymer was isolated by filtration and was washed thoroughly with distilled water to remove unreacted monomers, emulsifier, and other impurities. The solid resin was dried for several hours at reduced pressure and 40° C (45% yield). The dried resin was found to have the following properties: ASTM heat-distortion temperature 88° C, flexural modulus 4.03 × 10$^5$ psi, softening temperature 94–98, ASTM oxygen transmission rate 0.69, ASTM vapor transmission rate (100% relative humidity) 9.9, and ASTM water vapor transmission (90% relative humidity) 8.9. This resin was thermoplastic at 185° C and thermosetting at 210° C.

EXAMPLES 2-7

In a similar manner, a series of copolymers of acrolein and indene were prepared and were found to have properties similar to those given in Example 1. These resins are summarized in the following table:

| Example | 2 | 3 | 4 | 5 | 6 | 7 |
| --- | --- | --- | --- | --- | --- | --- |
| water | 250 | 500 | 475 | 575 | 500 | 850 |
| emulsifier (Gafac) | 1.25 | 7.5 | 7.2 | 8.7 | 7.5 | 8.5 |
| K$_2$S$_2$O$_8$ | 2.5 | 2 | 1.9 | 2.3 | 2 | 2.8 |
| acrolein | 50 | 75 | 35 | 85 | 56.5 | 72 |
| indene | 50 | 25 | 65 | 15 | 43.5 | 28 |

We claim:

1. A copolymer composition resulting from the free-radical initiated copolymerization of a monomer mixture consisting of
   A. from 25 to 75% by weight of a member selected from the group consisting of acrolein and methacrolein and
   B. from 75 to 25% by weight of indene.

2. The composition of claim 1 wherein (A) is acrolein.

3. The process comprising copolymerizing in an aqueous emulsion in the substantial absence of molecular oxygen and in the presence of a free-radical generating polymerization initiator at a temperature of from about 0 to 100° C a mixture of a monomer mixture consisting of
   A. from 25 to 75% by weight of a member selected from the group consisting of acrolein and methacrolein and
   B. from 75 to 25% by weight of indene.

4. The process of claim 3 wherein (A) is acrolein.